United States Patent [19]

Knödel

[11] Patent Number: 4,501,192
[45] Date of Patent: * Feb. 26, 1985

[54] PISTON FOR PRECISION DOSING INSTRUMENT

[75] Inventor: Erich Knödel, Wertheim, Fed. Rep. of Germany

[73] Assignee: Walter Graf u. Co GmbH & Co., Wertheim, Fed. Rep. of Germany

[ * ] Notice: The portion of the term of this patent subsequent to Feb. 16, 1999 has been disclaimed.

[21] Appl. No.: 418,132

[22] Filed: Sep. 15, 1982

[30] Foreign Application Priority Data

Sep. 28, 1981 [DE] Fed. Rep. of Germany ....... 3138536

[51] Int. Cl.³ .......................... B23P 15/10; F16J 1/02
[52] U.S. Cl. ............................... 92/248; 29/156.5 R; 92/254; 604/222; 604/230
[58] Field of Search ................. 92/109, 248, 249, 254, 92/245; 29/447, 156.5 R; 604/222, 230; 222/386; 277/212 C

[56] References Cited

U.S. PATENT DOCUMENTS

| 2,315,944 | 4/1943 | Dick | 92/249 X |
| 2,607,342 | 8/1952 | Abel | 92/249 X |
| 2,895,773 | 7/1959 | McConnaughey | 92/249 X |
| 3,237,815 | 3/1966 | Ogle | 604/222 X |
| 4,315,454 | 2/1982 | Knodel | 92/249 X |

FOREIGN PATENT DOCUMENTS 2343687 3/1975 Fed. Rep. of Germany .

Primary Examiner—Irwin C. Cohen
Attorney, Agent, or Firm—Frank J. Jordan

[57] ABSTRACT

A piston for a precision dosing instrument includes a cylindrical core which may be made of glass, ceramic or metal, and a precision ground sleeve of polytetrafluorethylene disposed over the core. One end of the sleeve is closed while the core is open at both ends but the openings may have different diameters.

9 Claims, 3 Drawing Figures

PISTON FOR PRECISION DOSING INSTRUMENT

BACKGROUND OF THE INVENTION

This invention relates to a piston for a dosing precision instrument with a cylindrical core and a method for its manufacture.

A piston composed of a cylindrical core of glass, ceramic, or metal has been known from Federal Republic of Germany DE No. 27 43 911 B2, wherein a rigid, grindable sleeve jacket of a glass-fiber reinforced polytetrafluorethylene (GFPTFE) has been thermally shrunk thereon. This piston serves as a dosing piston for the glass cylinder of a dosing precision instrument. Herein a dosing instrument that is mostly used in laboratories is understood as a precise dosing instrument, of which a stable, reproducible dosing exactness of at least ±0.1 vol.-% is expected in the long run. This, in turn, requires observing as much as possible dimensioning and tightness requirements for the contact surface between the inside wall of the glass cylinder and the outer wall of the piston. It should, furthermore, be possible to subject such a dosing instrument to sterilization in the not-disassembled state, i.e. not disassembled while heated at or over 120° C. temperature. The piston used should, furthermore, be completely inert and stable in relation to all corrosive chemicals to be dosed. This, according to experience, in addition to a purely chemical consistency of the material employed to manufacture the piston jacket, presupposes that the walls of the jacket be absolutely impermeable to the media to be dosed.

This known piston has a few disadvantages in regard to the above requirements. Thus, for several reasons, it has been found desirable to preferably manufacture the core of the piston of a ceramic raw material. On formation of the jacket with an open front end at the working surface, however, the raw material of the ceramic core is vulnerable to corrosive attack by one of the corrosive media to be dosed. Yet, even the most expensive ceramic raw materials always contains small amounts of binding agents that can be dissolved out of the ceramic material. This causes problems which cannot be tolerated if, for instance, such a dosing precision instrument is to be used in connection with trace analysis. Attempts to close or lock the open closure area of the piston core by a jacket material have not been successful. Displacements of these closures occurred in all cases, which increased dosing errors in a measurable way.

Furthermore, efforts have been made to design construction of the cylindrical wall of the piston jacket as thin as possible. However, the loss of permeability of the PTFE raw material with its inherent porosity sets limits to such efforts. This is especially the case when a fiber-reinforced material, especially a glass fiber reinforced PTFE, is utilized. If, while utilizing such a raw material, a critical minimum wall thickness is not attained, then diffusion of the medium to be dosed across the phase limiting areas between the reinforcing fibers and the PTFE matrix occurs, which ultimately leads to destruction of the PTFE jacket. The GFPTFE jacket has to have a certain minimum thickness to prevent this from occurring which in the raw materials that are used most of the time, in terms of magnitudes, lies in the range of 1.0 mm or a little below this limit. For thermal reasons, however, thinner wall thicknesses were absolutely desirable. Such thinner wall thicknesses would not only extend the temperature working range of the dosing instrument, but also make sterilization of the not-disassembled instrument at higher temperatures possible.

Considering this state of the art, the present invention has as an object to provide a piston of the aforementioned type which can be formed with a closure jacket at its working end that does not shift in position and does not cause the glass cylinder to burst upon sterilization of the dosing precision instrument, and wherein the jacket can be formed with a reduced cylindrical wall thickness.

The invention provides, in a piston for a dosing precision instrument with a glass cylinder, not to shrink thermally the heretofore used rigid jacket onto a core of solid material or onto a core of a glass sleeve jacket closed at one end, i.e., the working end, but, instead, onto a rigid cylindrical core of glass, ceramic, or metal that is formed as a rigid tube open on both sides.

Herein the concept of a tube open on both ends comprises, on the one hand, tube-shaped cylindrical configurations, the inside diameter of which forms openings at both ends of equal diameter, as well as, on the other hand, round rods which, in comparison with the outer diameter, have a traversing opening, preferably continuous to the longitudinal axis, with a small up to a very small diameter. Such a traversing opening may also have differently stepped diameters. However, also cylindrical configurations with an inside boring may be understood under this concept, wherein the cylinder closure provided at the working side of the piston has at least one traversing opening which may have a relatively small diameter, and which as an individualized traversing opening is preferably located on the longitudinal axis of the cylindrical form.

Very surprisingly, it has been found that on thermal shrinking of a jacket closed on one end, closure areas are obtained at the working end which, after surface grinding, remain invariably smooth under all thermal and chemical conditions. The reasons therefore are not yet sufficiently known, but the results of the first experiments conducted show that radial tensioning forces acting on the open front of the piston core play a major role, the jacket closure thus being tensioned in the manner of a tympanic membrane across the open front end of the piston core.

Since in this way an hermetical sealing of the working area of the dosing piston by the material of the piston jacket is obtained, the manufacturer, as also the consumer, no longer has to fear an exchange between the medium to be dosed and the core material of the piston. The manufacturer of the dosing precision instruments may select the raw material for the piston core from a purely constructional view point, without being limited by the chemical properties of the raw material of the piston core. Moreover, the locking of the boundry surface between the piston jacket and the piston core opposite the medium to be dosed prevents the penetration of the medium to be dosed into the boundry area from the outstart. It was ascertained that thereby the durability of the piston can be extended especially in face of organic dissolving agents. At the same time, this makes it possible to form the cylinder wall thickness of the jacket up to inside the critical boundry area much thinner, without this affecting in any way the edge life of the piston.

However, it was ascertained that the greatest suprise derived from the utilization of a piston according to the present invention resided in the fact that a pure, not-reinforced PTFE could be used even for jacket closure thicknesses up to about 8 or 10 mm. A dosing precision instrument with a glass cylinder provided as a piston according to the present invention, namely a jacket of pure PTFE and a bottom closure in one piece with a thickness not larger than 10 mm, wherein the thickness of the cylindrical PTFE jacket wall is not larger than about 0.5 mm, can be heated in a not-disassembled state up to about 150° C. in a drying oven, without the risk of the glass cylinder of the dosing precision instrument ever bursting. It is assumed that this is made possible by the increased radial upsetting of the closure bottom resulting from the formation of the piston core as a tube that is open on both ends. The great advantage in utilizing a rigid jacket, formed from a massive semi-finished material of pure PTFE as compared to a corresponding jacket of a fiber-reinforced material of pure PTFE resides in the fact that such a jacket of not-reinforced PTFE remains impermeable up to distinctly smaller wall thicknesses since with pure PTFE, the risk of diffusion at the boundary area along the reinforcing fibers no longer exists. In addition, pure PTFE can better withstand chemical attack than reinforced PTFE.

According to the previously described formation of the device of this invention, the dosing percision instrument of the invention is preferably provided with a jacket of an unfilled and non-reinforced pure PTFE. In a comparision with the dosing piston known from Publication No. DE 23 43 687 A 1, which is provided with a PTFE layer applied through coating, the piston of the present invention, which is provided with a jacket of thermally shrunk semi-finished material, has the advantage of absolute impermeability even opposite aqueous mineral acids, concentrated aqueous alkali metal lyes as well as organic dissolving agents, especially carbon tetrachloride. Since the known piston coatings produced through coating are not, and cannot be, shrunk to the same extent as a PTFE semi-finished material, from which the piston of the present invention is produced, such impermeability cannot, in principle, be achieved in known pistons. In addition, the known pistons are substantially more vulnerable to mechanical damage.

As already indicated above, another advantage of the piston according to the present invention resides in the fact that the end closure of the jacket can be formed substantially thicker than the cylindrical jacket wall surface. In a futher embodiment of the invention, the bottom is preferably at least five times, and especially ten times as thick, measured in the axial direction than the cylindrical jacket wall measured in the radial direction. Such dimensions represent an ideal combination of thermal and chemical characteristics in the piston.

Besides the most simple form of a tube open on both ends with uniform inner diameter across the whole length of the tube, a tube has been found to provide especial advantages that is locked at the working end of the piston by a closure bottom, wherein, however, at least one passage opening through the bottom continues to be provided or is introduced. Such an embodiment may, for example, be obtained by using a type of tube cover wherein the traversing opening has been formed in the bottom of the cover or such traversing opening is already provided in lockable form. In the event that only one traversing opening is provided, the same is preferably provided coaxially to the longitudinal axis of the tube. If several traversing openings are provided on the closure bottom of the tube, the same are preferably arranged at equal radial distances from the axis, at the same angled distances, wherein primarily a traversing opening is provided on the axis.

The required cylinder may also be manufactured from a mostly massive cylinder form under consideration of the costs aspect as also to permit selection from a wider range of materials available for manufacturing the core. A boring is centrally provided in the longitudinal direction of the axis over the whole length of the core in such cylindrical form. The traversing boring may be provided in stepped form, wherein the only important point to observe is that the lower side of the corresponding closure bottom of the core be in contact with the upper or other end via an inside boring that runs through the core.

The provision of such a traversing boring ensures the exclusion of gas or air that may flow in from the bottom while shrinking the not-reinforced or reinforced PTFE jacket onto the core. This, on the one hand, facilitates the shrinking of the jacket itself. On the other hand, also closure shiftings or displacements of any kind which may, for example, originate through a pulling-in or curving-in in a tube opening with large diameter, are prevented. In this manner, high dosing precision is ensured also during longer periods of use in relationship to the long shelf life of the instrument.

The lower side of the closure bottom of the tube of the core is preferably made smooth and even, running perpendicularly to the plane of the longitudinal axis. In individual cases, however, the traversing opening may be slightly widened in the form of a concave opening at the outlet to the bottom side. To further improve contacting exactness or tightness of the jacket at the closure bottom of the tube, channels or grooves with small dimensions in the radial direction may be provided which in normal cases however do not reach up to the outer wall of the tube.

When a pure, not-reinforced PTFE is used, as also on utilization of a reinforced PTFE as a raw material for the jacket, especially a fiber or powder-reinforced PTFE, the jacket to be shrunk thermally on the core tube or the jacket sleeve, according to one embodiment of the invention, is preferably manufactured out of a massive solid material in the form of a round rod which is bored or reamed. Such a starting material distinguishes itself by an uncommonly large thickness, resulting in impermeability for the PTFE which has strong tendencies toward macro-porosity and micro-porosity. In addition, an absolutely tight transfer area is obtained, with no need to provide it by subsequent sintering, thus an absolutely tight connection between the closure bottom and the cylindrical jacket part is attained where even after years of continuous use, any diffusion of the medium to be dosed into the boundary surface between the jacket and the piston core is successfully excluded.

To manufacture the piston according to this invention, a solid material in the form of a round rod is preferably first cut to the desired length, being then provided with a boring or is reamed. The inner diameter of the PTFE cover or jacket thus manufactured through boring or lapping is preferably 2 to 3% smaller than the outer diameter of the core tube. The outer diameter of the PTFE sleeve to be thermally shrunk onto the core tube is larger than the nominal diameter planned for service purposes, being preferably larger by about 5 to 15% than the nominal diameter. The jacket thus produced from a reinforced or not-reinforced PTFE solid material may be shaped by material-lifting or machining and is heated uniformly to a temperature in a range between 200° to 250° C. The heated cover is then pressed over a core tube at room temperature. Subsequently, the thus obtained unified piston is cooled to room temperature. After the cooling, the outer jacket of the piston is ground to the nominal dimension and, in the case of a PTFE material filler, subsequently polished for precision.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
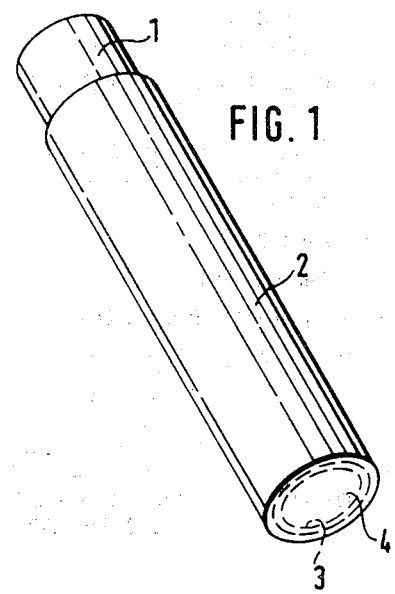
FIG. 1 is a schematic perspective representation of a piston according to one embodiment of the invention.

FIG. 1 is a perspective view of one embodiment of the present invention. A core 1 consists of a tube of ceramic or other material open on both ends, thus a tube which has an open front area 3 at the working end. A jacket 2 made of a pre-fabricated rigid PTFE tube has been thermally shrunk on the core, the tube being provided with an enclosed working surface 4 at the working end through a closure that has been formed onto it as one single piece. The working surface 4 and the cylindrical surface of jacket 2 thus have been formed in one single piece of a rigid semi-finished material. The closure with the working surface 4 closes the open front end 3 of the tube-shaped piston core 1. The outer diameter of the jacket 2 is formed of a rigid PTFE semi-finished material which has been made to fit snugly the glass cylinder on which the piston is inserted.

Figure 2:
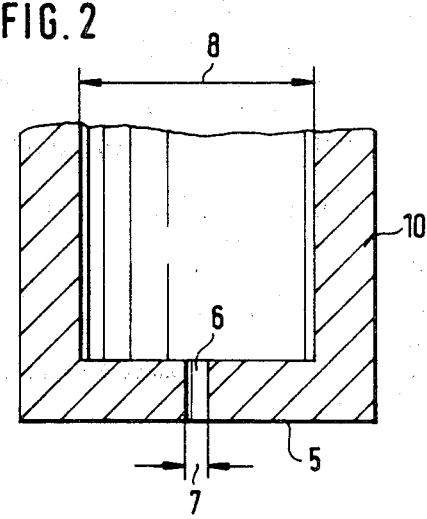
FIG. 2 is a partial axial sectional view through a core with a closure bottom but without the jacket.

Contrary to that shown in FIG. 1, in which the core is tube-shaped, the embodiment of the core according to FIG. 2 includes a tube which is provided with a closure 5 on the working side of the piston. The closure 5, which has approximately the same thickness as the tube walls, is provided with a passage opening 6 on the longitudinal axis of tube 10. This passage opening 6 has a substantially smaller diameter 7 than the inner diameter 8 of tube 10. The passage opening 6, which makes a connection between the outside of the closure 5 and the inside of tube 10, and thereby also with the end of the tube (not shown in FIG. 2), may be either already provided in form-fitted fashion or may be realized in a subsequent step, for instance by a boring in closure 5.

This form of tube 10, which is closed at the working end except for one or several passage openings, has the advantage that a jacket of a pre-fabricated, rigid PTFE can be better fitted by thermal shrinking since the passage opening 6 at the outside of the closure 5 of tube 10 makes it possible to exclude any and all gas or air inclusions on affixation of the jacket. When affixing the jacket, it is even viable to initially work with only slight overpressure from the inside of tube 10 and the passage opening 6 in the face of the jacket of PTFE to be affixed, in order to work at the subsequent affixation with a reduced pressure and, possibly, even with a slight underpressure.

Figure 3:
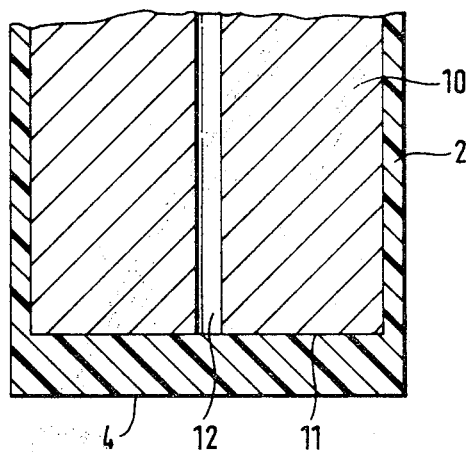
FIG. 3 is another partial axial sectional view of a core with the jacket.

FIG. 3 shows another embodiment of a core with an outer jacket 2, wherein the tube may, in principle, be a rather thick-walled tube which has only a small inner diameter. The embodiment according to FIG. 3 may, however, also be manufactured by providing a tube-shaped solid cylinder of a suitable material with a traversing opening 12 in the axial direction that runs from the upper end of the core up to the lower end. Also in this embodiment, a closure 11 is provided, which is arranged perpendicularly to the axis and, preferably, is completely flat.

The embodiments according to FIGS. 2 and 3, therefore, make it possible to form the core of the piston in an even more optimal way, independent of the physical and chemical parameters of the corresponding material of the tube. Only one traversing opening 6 and 13 is provided in the closure, which is provided to fit snugly. The diameter may be very small, as there must only be room for a gas or air exchange through the traversing opening.

What I claim is:

1. A piston for a precision dosing instrument comprising:
   a cylindrical core and a sleeve of polytetrafluoroethylene disposed on said core,
   said core being of glass, ceramic or metal and being formed as a rigid tube open at both longitudinal ends, said longitudinal end adjacent the working end of the piston is defined by a substantial planar surface extending perpendicularly of the longitudinal axis of the core with at least one relatively small opening therein forming a part of the opening of said tube,
   said sleeve being one integral piece with a cylindrical first portion extending about the cylindrical walls of said core and having a cylindrical outer surface and a closed end second portion extending over and engaging the longitudinal end of said core adjacent the working end of the piston, said closed end second portion having a greater thickness than said first portion and a planar front working face extending perpendicularly of the longitudinal axis of said core,
   said sleeve being thermally shrunk onto said core and precision-ground finished.

2. A piston according to claim 1, wherein said second portion is at least five times thicker than said first portion.

3. A piston according to claim 2, wherein said longitudinal end adjacent the working end of the piston is defined by a closure end part provided with said at least one opening.

4. A piston according to claim 1, wherein said rigid tube is defined by a uniform thick wall.

5. A piston according to claim 1, wherein said core has a through passage of two different diameters with the smaller diameter passage being at the working end of the said core and defined by said relatively small opening.

6. A piston according to claim 5, wherein said through passage is disposed coaxially of said core.

7. A method for manufacturing a piston according to claim 1 comprising the steps of providing a round rod of polytetrafluorethylene material, forming a longitudinally extending opening in said rod of a diameter smaller than the outer diameter of said core, said longitudinally extending opening extending substantially the longitudinal length of said rod but terminating short of one longitudinal end of said rod to thereby provide a closed end on said rod with said rod thereby defining said sleeve, heating said sleeve to a temperature of from 200° to 250° Centigrade, inserting said core into said heated sleeve while said core is at ambient temperature, allowing said sleeve to cool to thereby obtain a unified piston, and machining the outer sleeve to the desired diameter and finish.

8. A method according to claim 7 comprising initially cutting said rod to the desired length before forming said longitudinally extending opening.

9. A method according to claim 8 wherein said longitudinally extending opening is formed by drilling.

* * * * *